Figure 1:
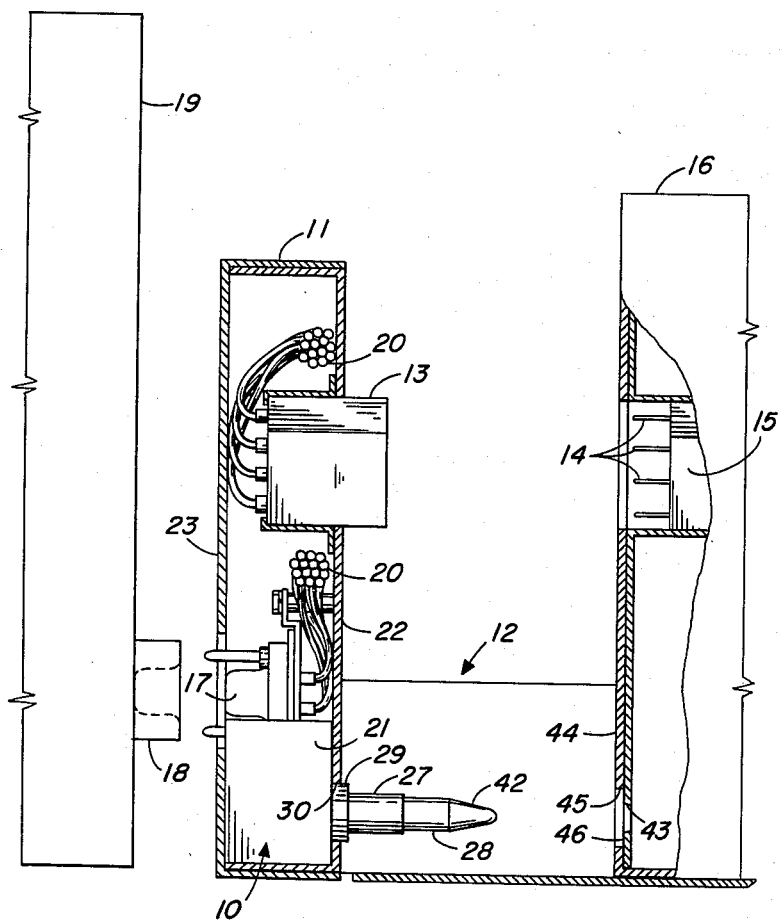

Jan. 7, 1964    E. F. ABODEELY    3,116,959
TELESCOPABLE GUIDE PIN

Filed Nov. 14, 1960    2 Sheets-Sheet 2

INVENTOR.
EDMUND F. ABODEELY
BY
Moody and Kutzinger
ATTORNEYS

United States Patent Office 3,116,959
Patented Jan. 7, 1964

3,116,959
TELESCOPABLE GUIDE PIN
Edmund F. Abodeely, Cedar Rapids, Iowa, assignor to Collins Radio Company, Cedar Rapids, Iowa, a corporation of Iowa
Filed Nov. 14, 1960, Ser. No. 68,909
2 Claims. (Cl. 339—66)

This invention relates to guide pins for proper mating between chassis or between a chassis and a chassis rack and is particularly concerned with a space saving telescoping guide pin.

Guide pins are used with mating chassis wherein the pins are generally mounted on one chassis unit and are adapted to seat in corresponding female mating means on the other chassis unit. Single unitary pins slidably mounted in such mating structure sometimes impose excessive space requirements in pin length consistent with axial movement encountered. Corresponding female mating means of a chassis unit catch and become centered on the bevelled conical end of representative pins and thereafter drive each pin back into its holder. With this action, adequate support for such pins is particularly important as they engage and align the female mating means of chassis being positioned. This has been provided by having additional supporting pin length always retained within the holder. Thus, even when the pin is in the retracted position the axial space requirements of the pin holder and the pin itself is excessive for some uses.

It is, therefore, a principal object of this invention to minimize axial space requirements imposed by chassis mating guide pins.

Features in the accomplishment of this object are the provision of a telescopable guide pin slidably held in a bore of a holder and having a tubular shell and a bullet member with an end adapted for mating engagement with a female opening of a chassis for guiding the chassis as it is being positioned. A spring structure is also employed within the bore of said holder for resiliently biasing the bullet member of said guide pin toward an extended position.

A specific embodiment representing what is presently regarded as the best mode of carrying out the invention is illustrated in the accompanying drawings.

Figure 4:
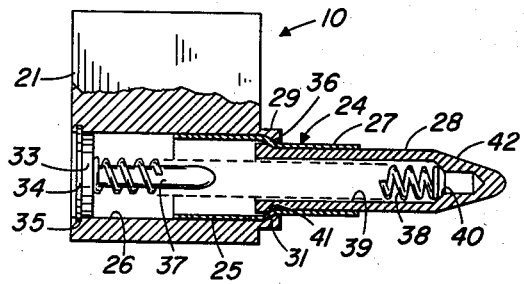
Figure 5:
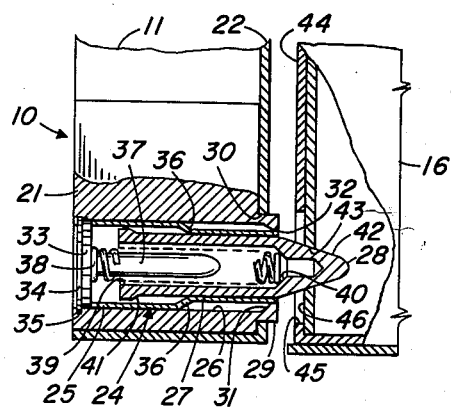
Figure 3:
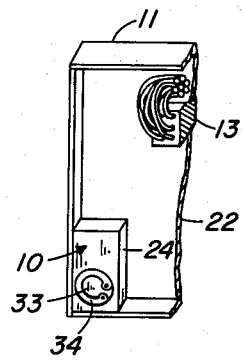
Figure 2:
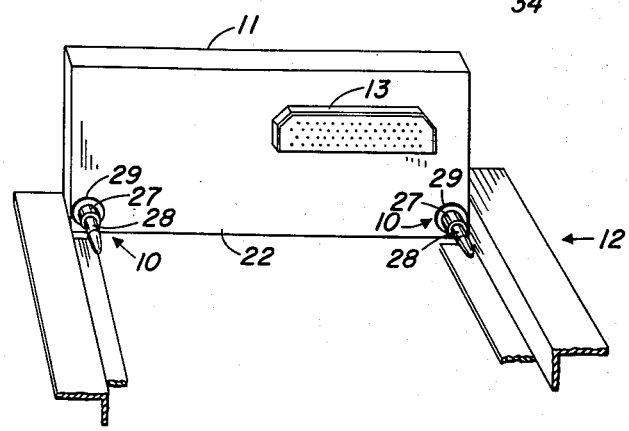

In the drawings:

FIG. 1 represents a chassis adapted for cooperative mating with another chassis or chassis rack which in turn mates additional equipment at the rear, and with the chassis and the chassis rack broken away to illustrate mating plug and socket elements and to show a telescopable guide pin and a cooperating female opening of a chassis;

FIG. 2, a fragmentary perspective view of a chassis rack equipped with two telescoping guide pins;

FIG. 3, a fragmentary perspective view showing the holding base of a telescopable guide pin in position in a chassis rack;

FIG. 4, a side elevation of a telescopable guide pin partially cut away in vertical section; and FIG. 5, a fragmentary view of the chassis and chassis rack showing a telescopable guide pin approaching the fully retracted position.

Referring to the drawings:

In the illustrated embodiment of the invention, two telescoping guide pins 10 are conveniently mounted in the end panel 11 of chassis rack 12. As shown in FIGURE 1, end panel 11 holds socket 13 for mating connection with multiple pins 14 of the plug 15 mounted on chassis 16, plug 17 for mating insertion in socket 18 of rack panel 19, and also contains connective wiring 20 as well as other electronic components (not shown). End panel 11 also mounts the holding base 21 of each telescopable guide pin 10 within the limited spacing between front panel wall 22 and rear panel wall 23.

Referring also to FIGURES 4 and 5, each telescopable guide pin 10 has a sleeve 24 with an enlarged annular base 25 slidably received in bore 26 of holding base 21, and is provided with a reduced diameter annular forward portion 27 which advantageously slidably holds the bullet member 28 of pin 10. Each holding base 21 has a forward projection 29 which projects through an opening 30 in front panel wall 22. Within projection 29 bore 26 ends in an annular bevel 31 and opening 32 and the bore is closed at the other end with a disc 33 conveniently held in place by lock ring 34 and groove 35.

Forward movement of sleeve 24 is limited by engagement of the sleeve annular bevel 36 with bore annular bevel 31. In addition, the enlarged annular base 25 and forward portion 27 of sleeve 24 are of such length that sleeve base 25 bottoms on disc 33, while portion 27 is still extending into opening 32. This provides additional aligning support for the telescopable guide pin, particularly for the bullet member 28 thereof through sleeve 24. However, there is no intention that this invention be limited to such sleeve 24 length as the annular base 25 may be adequately supported in bore 26 without needing additional aligning support from sleeve portion 27 in opening 32.

Disc 33 is provided with a guide post 37 for coil spring 38. This spring extends into bore 39 of bullet member 28 and is resiliently compressed between disc 33 and end 40 of bore 39 for resiliently biasing bullet member 28 toward its extended position. Bullet member 28 is prevented from moving beyond the forward extended position, such as shown in FIGURE 2, by abutment of annular bevelled flange 41 against bevel 36 when sleeve 24 is also in its forward extended position as restrained by annular bevel 31.

Bullet member 28 is provided with conical end 42 which is so bevelled as to never lock in the correspondingly bevelled mating female opening 43 of chassis 16. In addition, coil spring 38 is carefully chosen to provide optimum resilient biasing force on member 28 consistent with the bevel of conical end 42. In other words, this bevel and the spring force are so chosen that, as a general rule, the female openings 43 of the chassis unit 16, to be positioned and mated with end panel 11 of chassis rack 12, catch and become centered on the bevelled conical ends 42 of the respective guide pins 10 before subsequently driving bullet members 28 back to the rear telescoped positions. When chassis 16 is brought into full mating engagement with end panel 11 and guide pins 10 are fully telescoped, chassis wall 44 is in close proximity to end panel wall 22 and forward projections 29 of holders 21 extend into openings 45 of wall 44 and possibly bottom on recessed surface 46.

It appears that telescopable guide pins 10 provide sufficiently extended bullet members 28 as to insure alignment of chassis unit 16 before pins 14 of plug 15 contact and enter socket 13, and that this is accomplished by guide pins 10 mounted within the limited spacing between front panel wall 22 and rear panel wall 23. End panel 11 is necessarily of thin construction in order to fit between chassis 16 and rack panel 19 when in mated position therebetween. Thus, telescopable guide pins 10 prove particularly useful since a unitary slidable guide pin structure would require more axial space than available in panel 11 thickness.

Whereas there is here illustrated and described a preferred construction which I presently regard as the best mode of carrying out my invention, it should be understood that various changes may be made without departing from the disclosed inventive subject matter particularly pointed out and distinctly claimed hereinbelow.

I claim:

1. In mating chassis having a guide pin mounted in a bore on one chassis and corresponding female mating means on the other chassis a telescopable guide pin, comprising tubular sleeve means having an enlarged annular base slidably and retractably received in said bore and laterally supported by the wall of said bore through substantially the longitudinal length of said annular base, said sleeve means having a reduced diameter annular forward portion and an interconnecting wall portion between the base and the forward portion, a bullet member adapted for movement between an extended position and a retracted position, said bullet member being maintained in longitudinal alignment and slidably supported by the annular forward portion of said sleeve means and being provided with an end adapted for seating in said female mating means, means for resiliently biasing said bullet member toward the extended position, flange means on said bullet member for engaging the interconnecting wall portion between the base and the forward portion of the sleeve means for carrying the sleeve means forward to an extended position from a retracted position after the interconnecting wall portion is engaged by the flange means as the bullet is being moved toward the extended position, and bevel stop means projecting inwardly relative to the wall of said bore to stopping alignment with the interconnecting wall portion of said sleeve means for limiting outward axial movement of both said bullet member and the tubular sleeve means.

2. In connector telescoping guide means, support means having a bore restricted at its end to stop a sleeve bevel, with the telescoping guide means comprising, tubular sleeve means having an enlarged annular base slidably and retractably received in said bore and laterally supported by the wall of said bore thorugh substantially the longitudinal length of said annular base, said sleeve means having a reduced diameter annular forward portion and an interconnecting wall portion between the base and the forward portion, with the interconnecting wall portion being the sleeve bevel stopped by the restriction at the end of the bore, a bullet member adapted for movement between an extended position and a retracted position, said bullet member being maintained in longitudinal alignment and slidably supported by the annular forward portion of said sleeve means and being provided with an end adapted for seating in female mating means of a chassis unit, means for resiliently biasing said bullet member toward the extended position, and flange means on said bullet member for engaging the interconnecting wall portion between the base and the forward portion or the sleeve means for carrying the sleeve means forward to an extended position from a retracted position after the interconnecting wall portion is engaged by the flange means as the bullet is being moved toward the extended position.

References Cited in the file of this patent

UNITED STATES PATENTS

| 2,091,470 | Douglas | Aug. 31, 1937 |
| 2,735,965 | Balanda | Feb. 21, 1956 |

FOREIGN PATENTS

| 673,092 | Great Britain | June 4, 1952 |

UNITED STATES PATENT OFFICE
CERTIFICATE OF CORRECTION

Patent No. 3,116,959                                January 7, 1964

Edmund F. Abodeely

It is hereby certified that error appears in the above numbered patent requiring correction and that the said Letters Patent should read as corrected below.

Column 4, line 21, for "or" read -- of --.

Signed and sealed this 26th day of May 1964.

(SEAL)
Attest:

ERNEST W. SWIDER                              EDWARD J. BRENNER
Attesting Officer                                 Commissioner of Patents